Sept. 16, 1952 J. H. HAMMOND, JR 2,611,027

TELEVISION STILL PICTURE TRANSMITTING AND RECORDING SYSTEM

Filed July 10, 1948 2 SHEETS—SHEET 1

Inventor
JOHN HAYS HAMMOND, JR.

By [signature]

Attorney

Inventor
JOHN HAYS HAMMOND, JR.
By
[signature]
Attorney

Patented Sept. 16, 1952

2,611,027

UNITED STATES PATENT OFFICE 2,611,027

TELEVISION STILL-PICTURE TRANSMITTING AND RECORDING SYSTEM

John Hays Hammond, Jr., Gloucester, Mass.

Application July 10, 1948, Serial No. 38,073

5 Claims. (Cl. 178—6.7)

This invention relates to television systems and more specifically to a system for transmitting news by television on a selected schedule.

The invention comprises means in connection with a standard television system for scanning and transmitting a news sheet and also for transmitting a characteristic control signal which operates means at the receiver to cause the news sheet to be photographed when it appears on the receiver television tube. The exposed film is then processed and projected by an optical system on a second screen.

The invention also consists in certain new and original features of construction and combinations of parts hereinafter set forth and claimed.

Figure 1:
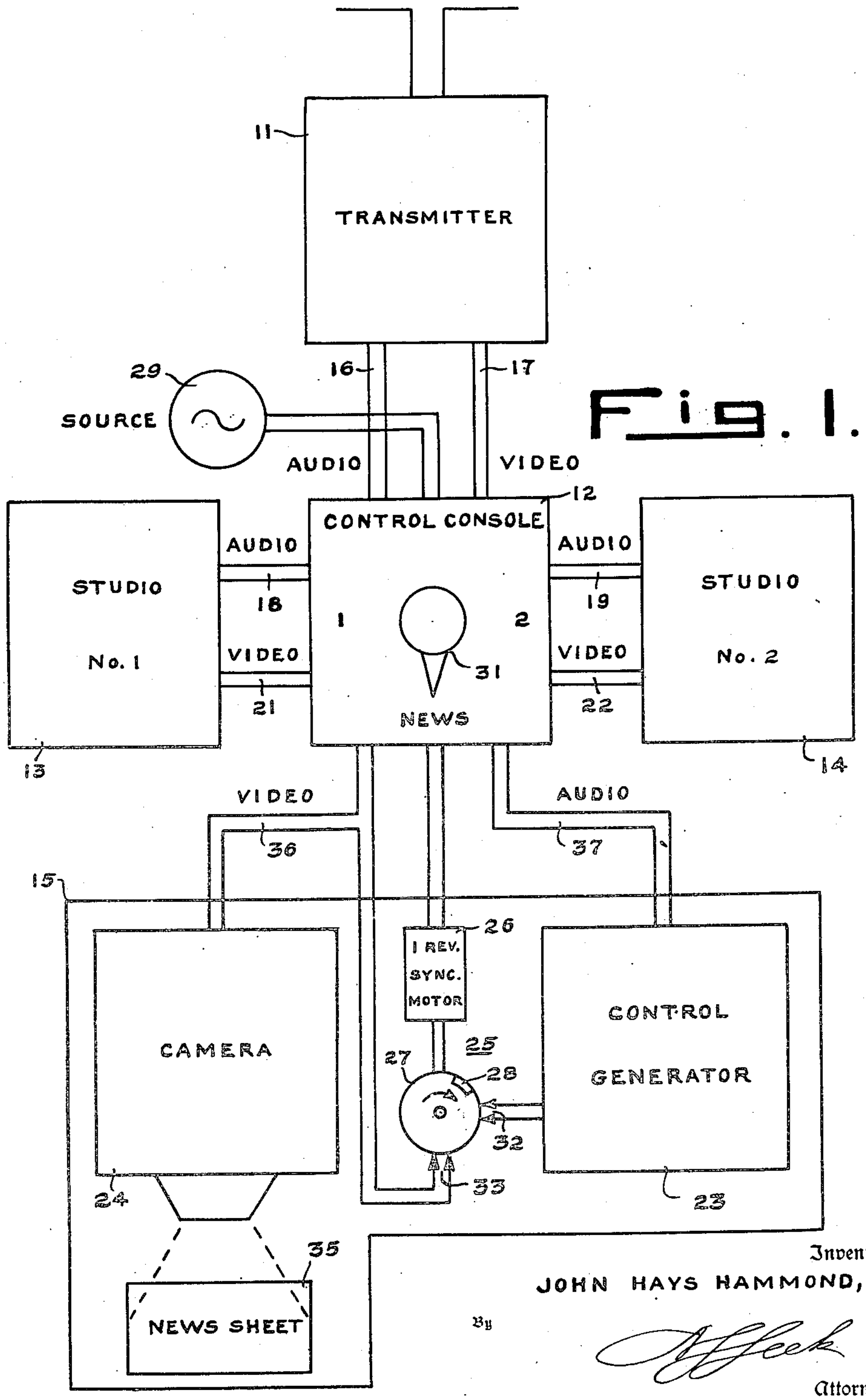
Figure 2:
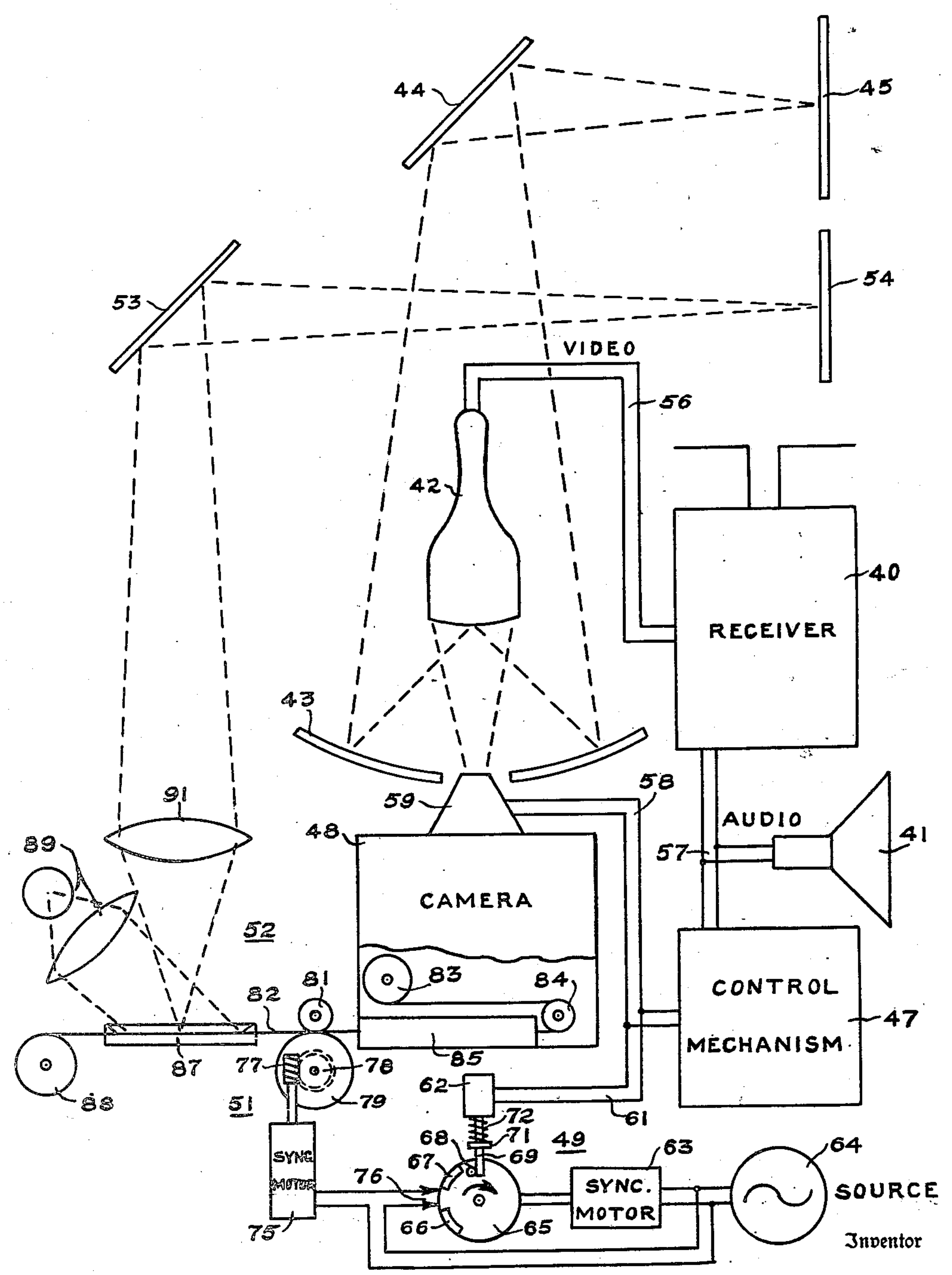

The nature of the invention, as to its objects and advantages, the mode of its operation and the manner of its organization, may be better understood by referring to the following description, taken in connection with the accompanying drawings forming a part thereof, in which:

Fig. 1 is a diagrammatic view of a television transmitting system constructed in accordance with the invention, and Fig. 2 is a diagrammatic view of a television receiving system used in connection with the transmitting system shown in Fig. 1.

Like reference characters denote like parts in the several figures of the drawings.

In the following description parts will be identified by specific names for convenience, but they are intended to be generic in their application to similar parts.

Referring to the drawings and more particularly to Fig. 1, the transmitting system consists of a standard television transmitter 11, a control console 12, two studios 13 and 14 and a news room 15. The control console is connected to the transmitter 11 by an audio channel 16 and a video channel 17, and to the two studios 13 and 14 by audio channels 18 and 19 and video channels 21 and 22 respectively. Television studios and transmitters are discussed fully in Principles of Television Engineering by Donald G. Fink, McGraw-Hill Book Company, Inc., 1940. The console 12 may incorporate a simple switch having successive contacts. It may be a rotary switch of the barrel type or a Yaxley switch.

The news room 15 comprises a control generator 23, a television camera 24 and a timing mechanism 25. The control generator 23 can be a simple audio oscillator well known in the art. The timing mechanism 25 consists of a self-starting synchronous motor 26 on the shaft of which is mounted a commutator 27 which is made of insulating material and is provided with a contact segment 28. A 60 cycle or other suitable A. C. generator 29 is provided which is connected through the control console 12 to the motor 26 in such a way that when the control console indicator 31 is turned to "News" the motor 26 will cause the commutator 27 to make one complete revolution in a clockwise direction and come to rest in its initial position. Engaging the commutator 27 are two sets of contacts 32 and 33, the former being connected to the control generator 23 and the latter being connected in the video output circuit 36 of the camera 24 which is connected to the control console. A news sheet 35 is shown as placed in position to be viewed by the camera 24. The control console 12 is connected to the control generator 23 by an audio channel 37.

Referring to Fig. 2 the receiving system includes a television receiver 40, a loud speaker 41, a kinescope 42, a concave mirror 43, a plane mirror 44, and a television screen 45. If the concave mirror is spherical, as is usual, a corrective lens may be used as in standard practice. Principles of Television Engineering noted above describes television receivers and their accessories. For recording and projecting the news flashes a control mechanism 47 is provided together with a camera 48, a timing mechanism 49, a feeding mechanism 51, a projecting system 52, a plane mirror 53 and a news screen 54.

The receiver 40 is connected to the kinescope 42 by a video channel 56 and to the loud speaker 41 and control mechanism 47 by an audio channel 57. The control mechanism 47 includes a filter selector system, an amplifier and rectifier. The output circuit of the control mechanism 47 is connected by conductors 58 to the shutter mechanism 59 of the camera 48 and by branch conductors 61 to a solenoid 62 forming part of the timing mechanism 49. Patent No. 2,386,997, granted to C. J. Young on October 16, 1945, shows in Fig. 2 thereof a means for separating a tone signal. Delay means in the form of a well-known thermally-operated or dash-pot controlled switch may be provided for obtaining the predetermined time interval mentioned hereinafter.

The timing mechanism 49 comprises a self-starting synchronous motor 63 supplied with current from an A. C. source 64. Mounted on the shaft of the motor 63 is a disc 65 of insulating material which is provided with two contact segments 66 and 67 and a pin 68. The solenoid 62 is provided with a core 69 to which is secured a collar 71. Between the collar 71 and the solenoid 62 is mounted a coil spring 72. Normally the core 69 engages the pin 68 preventing the rotation of the disc 65 by the motor 63 which is continuously energized from the source 64 and is so constructed that it may be operated under these conditions.

The feeding mechanism 51 comprises a self-starting synchronous motor 75 which is supplied with power from the source 64 and which is connected to a pair of contacts 76 which engage the periphery of the disc 65. Mounted on the shaft of the motor 75 is a worm gear 77 which meshes with a worm wheel 78 mounted on the shaft of a roller 79 between which and a second roller 81 passes the film 82 from the camera 48.

The film 82 is initially wound on a spool 83 from which it is fed through the camera 48 and over a roller 84. The film 82 then passes through a processing chamber 85 where the image on the film is developed and made into a positive print by any well known method such as the Land process of the Polaroid Co.

The projecting system 52 comprises news sheet frame 87, a take up roll 88, provided with an internal spring mechanism not shown, on which the film 82 is wound up, a lamp and lens system 89 for illuminating the film 82 when it is in the frame 87, and an optical system 91 for projecting an image of the news sheet on the screen 54.

*Operation*

Normally the transmitting system shown in Fig. 1 is used for transmitting standard types of telecasts from either studio 13 or 14 in a well known manner. In either case the indicator 31 on the control console 12 is turned to position 1 or 2. Under these conditions the telecasts are picked up by the receiver 40, Fig. 2, which operates the kinescope 42 and loud speaker 41 in the usual manner to produce the television image on the screen 45 and the audio signal in the loud speaker 41.

When it is desired to send a news flash the news sheet 35 is placed in position in front of the television camera 24 and the control generator 23 is started. At the time when it is desired to send the news the indicator 31 is turned to the "News" position as shown in Fig. 1. This closes a circuit from the source of A. C. 29 to the synchronous motor 26 which starts rotating the disc 27 in a clockwise direction as indicated by the arrow. As the disc 27 rotates the segment 28 will engage the contacts 32, thus causing the control generator 23 to send out a distinctive signal over the audio channels 37 and 16 to the transmitter 11 which sends it as a radio signal.

This distinctive audio signal is picked up at the receiver 40, Fig. 2, and passes to the control mechanism 47, the circuits of which are tuned to this particular type of signal. After a predetermined time interval depending upon the characteristics of the audio circuits a control signal will be sent out over the circuits 58 and 61. The control signal over the circuit 58 will operate the shutter mechanism 59 of the camera 48. At this same instant the disc 27, Fig. 1, will have rotated to a position such that the segment 28 will engage the contacts 33 which cause the video output circuit 36 to operate. It is thus seen that a telecast of the news sheet is sent out at the same instant that the camera 48 takes a picture of the screen of the kinescope 42 on the film 82, due allowance being made for the time required for transmission.

The indicator 31 of the control console 12 is then turned to one of the studios and the regular telecast program is continued as before. The transmission of the news and the audio control signal has been so rapid that it appears merely as a flash on the screen 45 and a short characteristic audio tone in the loud speaker 41, so that no appreciable time is taken away from the regular telecast program.

The signal sent over the channel 61 by the control mechanism 47 energizes the solenoid 62 causing the core 69 to be moved out of engagement with the pin 68 thus allowing the disc 65 to start rotating in a clockwise direction, as indicated by the arrow, under the action of the synchronous motor 63. After a brief interval of time the segment 66 will engage the contacts 76 causing the synchronous motor 75 to start, rotating the roller 79 in a counterclockwise direction. This will cause the film 82 to be moved to the left and the exposed portion will be pulled into the processing chamber 85, where it will remain, as by this time the segment 66 will have moved out of engagement with the contacts 76 thus stopping the motor 75.

The film 82 remains in the processing chamber 85 a predetermined time depending on the nature of the process. At the end of this time interval the segment 67 will engage the contacts 76 thus starting the motor 75 which again will rotate the roller 79 in a counterclockwise direction to move the exposed and printed film 82 from the processing chamber 85 to the frame 87 from which the news sheet will be projected by the optical system 91 upon the screen 54.

If found desirable the control signal may be sent over the video channel instead of the audio channel.

The projecting system 52 may be dispensed with and the positive print of the news film may be viewed directly or torn off and used as a news sheet for distribution.

The video signals may also be recorded temporarily or permanently by so called memory circuits, such as by magnetic recording, or by producing a variable electric charge distribution over a two dimensional surface. These recordings may be reproduced as a video picture whenever desired.

This device may also be adapted for other than news purposes.

Although only one of the various forms in which this invention may be embodied has been shown herein, it is to be understood that the invention is not limited to any specific construction but may be embodied in various forms without departing from the spirit of the invention.

What is claimed is:

1. A system comprising a television transmitting station and a television receiving station for utilizing television type transmission for the facsimile transmission of a still picture during a time pause in the transmission of a television program, said transmitting station having means for transmitting regular television programs, said transmitting station having a first means for sending remote control signals, said transmitting station having a second means for televising the still picture to be recorded, timing means at said transmitting station to actuate said second transmitting station means subsequent to the sending of said control signals by said first transmitting station means, said receiving station having means for receiving regular television programs, said receiving station having a first means for recording a transmitted picture, said receiving station having a second means responsive to said remote control signals to control the operation of said first receiving station means, means to time the timed relation of actuation of said second transmitting station means with respect to the operation of said first receiving station means, and delay means at said receiving station responsive to said first transmitting station means whereby the recorder is actuated only by the still picture to the exclusion of the television program.

2. A system as set forth in claim 1 in which said timing means comprises a transmitting station timer having means to control the transmission of said control signals and said televised picture, and a receiving station timer responsive to said control signal and having means rendering the recorder operative to record said transmitted televised picture.

3. A system as set forth in claim 2 in which the first receiving station means includes means for conditioning the recorded picture for display, and the receiving station timer includes means to time the operation of said conditioning means so that the recorded picture is automatically displayed.

4. A television receiver and projector comprising a kinescope screen, a viewing screen in the optical field thereof, a camera focused on said kinescope screen and having a shutter mechanism and a film chamber, a processing chamber, a projection station including a projection light and a projection screen arranged to project an image from said film onto said projection screen, means feeding said film from said film chamber through said processing chamber and through said projection station in sequence, selective means in said receiver responsive to a control signal and timed means responsive to the central signal selected by said selective means to actuate said shutter mechanism to record the image of said kinescope screen on said film, then actuate said feed means to advance the film for processing and projection in proper timed sequence.

5. A television receiver comprising a kinescope screen, a viewing screen in the optical field thereof, a camera focused on said kinescope screen and having a shutter mechanism and a film chamber, a processing chamber, means feeding said film from said film chamber through said processing chamber, selective means in said receiver responsive to a control signal and timed means responsive to the central signal selected by said selective means to actuate said shutter mechanism to record the image of said kinescope screen on said film, then actuate said feed means to advance the film for processing.

JOHN HAYS HAMMOND, Jr.

REFERENCES CITED

The following references are of record in the file of this patent:

UNITED STATES PATENTS

| Number | Name | Date |
|---|---|---|
| 2,166,247 | Hartley | July 18, 1939 |
| 2,181,564 | Goldsmith | Nov. 28, 1939 |
| 2,251,786 | Epstein | Aug. 5, 1941 |
| 2,314,471 | Wright | Mar. 23, 1943 |
| 2,314,920 | Burnstead | Mar. 30, 1943 |
| 2,369,783 | Homrighous | Feb. 20, 1945 |
| 2,402,083 | Reid | June 11, 1946 |
| 2,420,029 | Brady | May 6, 1947 |
| 2,429,921 | Brady | Oct. 28, 1947 |
| 2,454,651 | Homrighous | Nov. 23, 1948 |
| 2,474,297 | Young | June 28, 1949 |
| 2,481,410 | Goldsmith | Sept. 6, 1949 |
| 2,486,717 | Maurer | Nov. 1, 1949 |
| 2,489,835 | Traub | Nov. 29, 1949 |

FOREIGN PATENTS

| Number | Country | Date |
|---|---|---|
| 477,355 | Great Britain | Dec. 28, 1937 |
| 598,491 | Germany | June 11, 1934 |
| 687,728 | Germany | Feb. 5, 1940 |